(12) United States Patent
O'Connor et al.

(10) Patent No.: US 10,282,213 B2
(45) Date of Patent: May 7, 2019

(54) SYSTEM AND METHOD FOR CONVERSATIONAL CONFIGURATION OF APPLICATIONS

(71) Applicant: Avaya Inc., Basking Ridge, NJ (US)

(72) Inventors: Neil O'Connor, Galway (IE); Tony McCormack, Galway (IE); Paul D'Arcy, Limerick (IE)

(73) Assignee: Avaya Inc., Basking Ridge, NJ (US)

( * ) Notice: Subject to any disclaimer, the term of this patent is extended or adjusted under 35 U.S.C. 154(b) by 1083 days.

(21) Appl. No.: 13/908,240

(22) Filed: Jun. 3, 2013

(65) Prior Publication Data

US 2014/0358549 A1 Dec. 4, 2014

(51) Int. Cl.
*G06F 9/445* (2018.01)
*H04M 3/493* (2006.01)
*G10L 15/183* (2013.01)

(52) U.S. Cl.
CPC ........ *G06F 9/44505* (2013.01); *H04M 3/493* (2013.01); *G10L 15/183* (2013.01)

(58) Field of Classification Search
CPC . G06F 17/2241; G06F 17/2247; G10L 13/00; G10L 15/00; G10L 15/183; G10L 15/26; G10L 15/265
USPC ........................................................ 709/220
See application file for complete search history.

(56) References Cited

U.S. PATENT DOCUMENTS

| | | | | |
|---|---|---|---|---|
| 6,999,930 B1* | 2/2006 | Roberts | ................. | G10L 15/193 379/88.01 |
| 7,707,504 B2* | 4/2010 | Quang | ................. | G06F 17/3007 709/232 |
| 8,185,517 B1* | 5/2012 | Wood | ..................... | G06Q 10/00 707/713 |
| 2006/0129781 A1* | 6/2006 | Gellai | ................... | G06F 3/0605 711/170 |
| 2008/0127162 A1* | 5/2008 | Xu | ...................... | G06F 9/44505 717/168 |
| 2012/0303356 A1* | 11/2012 | Boyle | ............... | G06F 17/30672 704/9 |

(Continued)

*Primary Examiner* — Glenton B Burgess
*Assistant Examiner* — Patrick F Ngankam
(74) *Attorney, Agent, or Firm* — Stevens & Showalter, LLP (57) ABSTRACT

A configuration-file generation system for generating a configuration-file to configure an application for an enterprise is provided. The configuration-file generation system includes an IVR module for enabling a user to verbally interact with the configuration-file generation system. The configuration-file generation system further includes an analyzing module for analyzing and querying any information missed by the user. The configuration-file generation system further includes a suggestion module for searching and suggesting possible options corresponding to the missing information with the help of semantic web technology and with an experience database. The configuration-file generation system further includes a configuration-file generation module for generating a configuration-file based on available information received from the user. The configuration-file may then be passed to an application configuration module for configuring the application as required.

23 Claims, 4 Drawing Sheets

(56) References Cited

U.S. PATENT DOCUMENTS

2014/0040275 A1* 2/2014 Dang ................ G06F 17/2785
707/741
2014/0189843 A1* 7/2014 Francisco ........... H04L 63/0853
726/9

* cited by examiner

SYSTEM AND METHOD FOR CONVERSATIONAL CONFIGURATION OF APPLICATIONS

BACKGROUND

Field of the Invention

Embodiments of the present invention generally relate to the configuration of an application. More specifically, the present invention relates to a system and method to enable a user to configure an application over a network.

Description of Related Art

It is common practice for enterprises to hire and train highly skilled technicians/users for configuring applications on servers. This is required as configuration of an application is a complex and critical task that needs a lot of instructions to be followed. Incorrect information or missing instructions may harm functioning of the server or may lead to miss-configured applications. Therefore, enterprises develop a lot of manuals to help the users in configuring applications. This again requires a lot of effort and time of the user, and still does not guarantee perfection and thus retains a risk of sub-optimal configuration.

Further, it is a common practice for a user to remain on site while configuring an application as the user needs to be in direct session with administrative components of the application. For example, in many applications, a user may need to have administrative credentials to complete the configuration task such as an administrative password and so on. Thus, to carry out the configuration process completely, the user needs to be in a direct session with the application for configuration thereof. Furthermore, the user is required to handle a lot of visual APIs to process the configuration task, which again requires skills and training. Moreover, in certain cases, users need to perform a repetitive action during application configuring process, which requires extra time and effort of the user. Additionally, the users do not have the flexibility to use their own devices (BYOD initiative) for configuring the applications.

Moreover, in case of bugs in configurations, users are totally dependent on the manuals and on the Internet for searching solutions. The user may either lodge a complaint to the support teams corresponding to the bugs or may search the Internet to check if anyone else has reported similar bugs and corresponding solutions. In addition, the users may search within knowledge databases to gain required information. This again requires a lot of time and effort by the user to configure a required application.

Therefore, there is a need for a system and method for configuring an application that is economical, fast, flexible, easy to implement, and user friendly. Moreover, there is a need for a system and a method that enables the users to use their own devices for configuring applications.

SUMMARY

Embodiments in accordance with the present invention provide an enterprise server comprising a configuration-file generation system for generating a configuration-file to configure an application. The configuration-file generation system comprises an interactive voice response (IVR) module to interact with a user for querying and receiving information corresponding to configuration of the application. The configuration-file generation system further comprises an analyzing module for analyzing the received information to determine missing information for enabling the IVR module to query and receive missing information from the user, wherein the missing information is required to configure the application. The configuration-file generation system further comprises a configuration-file generation module for generating a configuration-file comprising a complete set of instructions required to configure the application of the enterprise, the configuration-file generated based on the information received from the user. Moreover, the enterprise server additionally comprises an application configuration module for configuring the application based on the generated configuration-file.

Embodiments in accordance with the present invention provide a configuration-file generation system for generating a configuration-file to configure an application for an enterprise in absence of a network. The configuration-file generation system comprises an IVR module to interact with a user for querying and receiving information corresponding to configuration of the application. The configuration-file generation system further comprises an analyzing module for analyzing the received information to determine missing information for enabling the IVR module to query and receive missing information from the user, wherein the missing information is required to configure the application. The configuration-file generation system further comprises a configuration-file generation module for generating a configuration-file comprising a complete set of instructions required to configure the application of the enterprise, the configuration-file generated based on the information received from the user.

Embodiments in accordance with the present invention further provide a computer-implemented method for automatically configuring an enterprise application. The method includes receiving a voice communication call from a user, querying the user corresponding to various instructions required for configuring the enterprise application, receiving and interpreting voice responses from the user corresponding to queries, generating a configuration-file based on received voice responses from the user for configuring the enterprise application, configuring the enterprise application automatically based on information stored in the configuration-file.

Further, the present invention can provide a number of advantages depending on its particular configuration. Embodiments of the present invention provide a system and a method for generating a configuration-file based on voice communication with a user. The user is prompted by the system to tell requirements. The user then verbally communicates the requirements to the system. This makes the system very user friendly.

Furthermore, the present invention goes beyond the state of the art technologies of configuring applications and uses semantic web technology to automatically retrieve most of required information from web and keeps minimal liability on the user for providing required information. This means the system has the capability within itself to discover the administrative/configuration services it requires. The voice-driven system has a business need to perform a configuration, and voice is translated using semantic web technology to a series of discoveries of exposed services requiring configuration. This removes a need for the system to have built-in knowledge of the systems that need to be selected for configuration changes. The Semantic Web option also offers a path to solve the problem of dependent applications, which require configuration. For example, during a contact center application configuration, UC and/or call recording applications (are dependent) must also be configured accordingly. Semantic web may be used to determine such dependent components and can be configured suitably. This saves a lot of time and effort of the user in configuring applications.

Moreover, the present invention enables a user to use their own devices such as cell phones or laptops to configure required applications over a network. This allows the users from having to remain on site while configuring the required application and instead provides a flexibility of configuring applications, in an enterprise, from any geographical location.

In addition, the present invention also allows the user to utilize normally unproductive time periods (such as airplane travel) for generating configuration-files even in absence of any network. As the user can create multiple configuration-files in absence of network and can send the configuration-files to designated server after establishing network connection. The configuration-files can be produced and compiled for correctness. This saves a lot of time and effort of the users. Further, the configuration-file is an XML file that contains a complete set of required configuration information. The XML file is used as input to a module in the server, which drives a series of sequential web service invocations on the administration component to introduce the configuration into the server.

Further, embodiments of the present invention support interaction with a user via voice medium to facilitate an intelligence-driven conversational flow, output of which is a series of structured, automated invocations that give effect to the configuration process. Embodiments of the present invention further allow for a verbal configuration to be prepared and validated while isolated from all networks, and using semantic web technology, for the system to discover autonomously the devices that need to be configured and how to invoke the administrative changes. The present invention further includes a logic-based system that has awareness of required and optional configuration parameters for configuring an application.

These and other advantages will be apparent from the disclosure of the present invention contained herein.

The preceding is a simplified summary of the present invention to provide an understanding of some aspects of the present invention. This summary is neither an extensive nor exhaustive overview of the present invention and its various embodiments. It is intended neither to identify key or critical elements of the present invention nor to delineate the scope of the present invention but to present selected concepts of the present invention in a simplified form as an introduction to the more detailed description presented below. As will be appreciated, other embodiments of the present invention are possible utilizing, alone or in combination, one or more of the features set forth above or described in detail below.

BRIEF DESCRIPTION OF THE DRAWINGS

The above and still further features and advantages of the present invention will become apparent upon consideration of the following detailed description of embodiments thereof, especially when taken in conjunction with the accompanying drawings, and wherein.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including but not limited to. To facilitate understanding, like reference numerals have been used, where possible, to designate like elements common to the figures.

DETAILED DESCRIPTION

The present invention will be illustrated below in conjunction with an exemplary communication system, e.g., the Avaya Aura® system. Although well suited for use with, e.g., a system having an automatic call distribution (ACD) or other similar contact processing switch, the present invention is not limited to any particular type of communication system switch or configuration of system elements. Those skilled in the art will recognize the disclosed techniques may be used in any communication application in which it is desirable to provide improved contact processing.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read.

A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the present invention is considered to include a tangible storage medium or distribution medium and prior art-recognized equivalents and successor media, in which the software implementations of the present invention are stored.

The terms "determine", "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the present invention is described in terms of exemplary embodiments, it should be appreciated those individual aspects of the present invention can be separately claimed.

The term "switch" or "server" as used herein should be understood to include a PBX, an ACD, an enterprise switch, or other type of communications system switch or server, as well as other types of processor-based communication control devices such as media servers, computers, adjuncts, etc.

Figure 1:
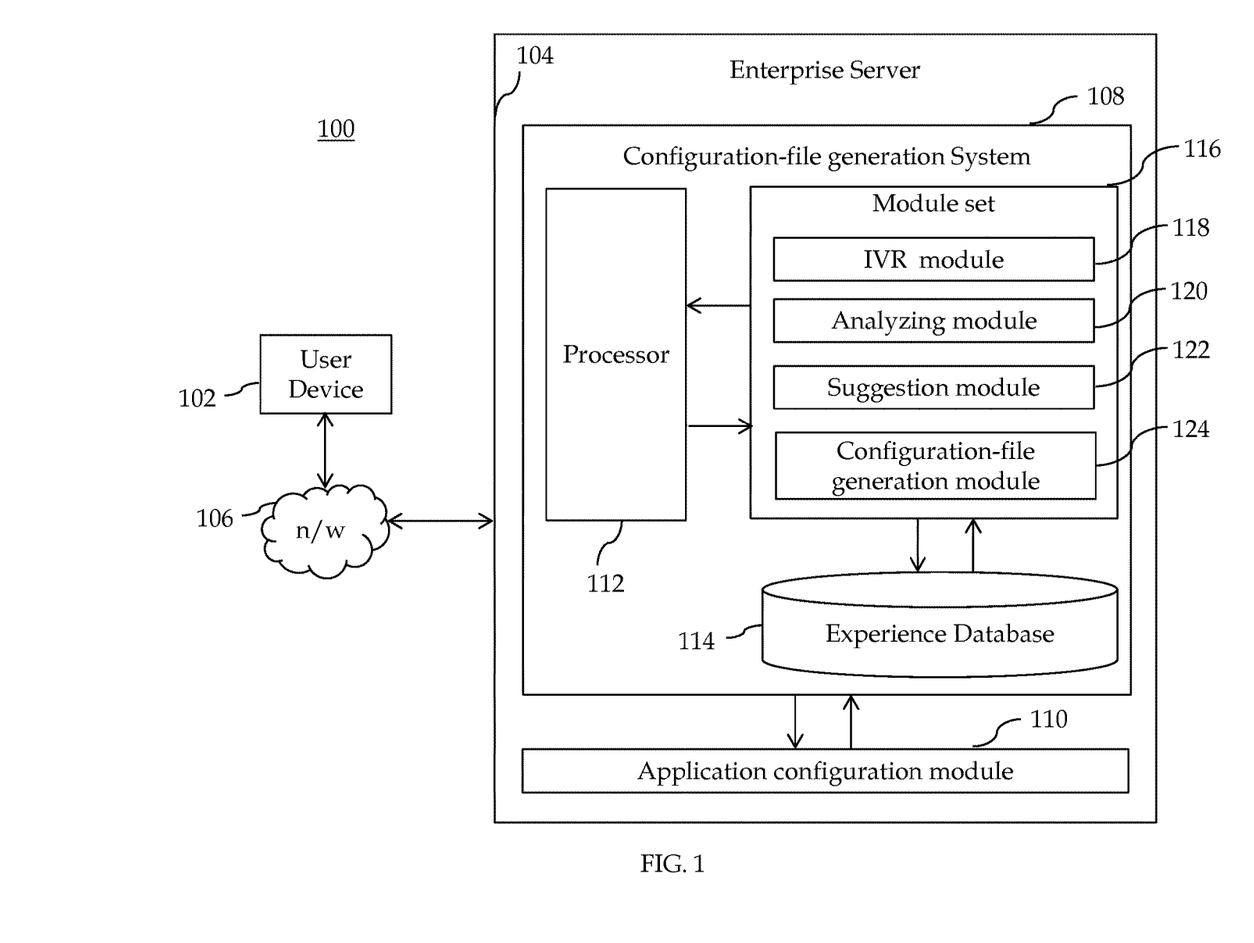
FIG. 1 illustrates an exemplary environment where various embodiments of the present invention are implemented.

FIG. 1 illustrates an exemplary environment 100 where various embodiments of the present invention are implemented. The environment 100 includes a user device 102 that is in communication with an enterprise server 104 via a network 106. The network 106 may include, but is not restricted to, a communication network such as Internet, PSTN, Local Area Network (LAN), Wide Area Network (WAN), Metropolitan Area Network (MAN), and so forth. In an embodiment, the network 106 can be a data network such as the Internet. Further, the user device 102 may refer to an electronic device that may be utilized by its user to communicate with the enterprise server 104 via the network 106. Examples of the user device 102 may include, but are not restricted to, a personal computer, a mobile phone, a smart phone, a personal digital assistant (PDA), a tablet computer, a laptop and the like. Furthermore, in an embodiment, the enterprise may be a contact center.

Further, as shown, the enterprise server 104 includes a configuration-file generation system 108 and an application configuration module 110. In an embodiment, the enterprise server 104 is configured to allow an authenticated user to configure an application, such as a contact center application. Further, the enterprise server 104 uses the configuration-file generation system 108 for generating a configuration-file (in any computer readable format, such as, but is not restricted to, XML format) that includes a complete set of instructions, which is required to configure an application on the enterprise server 104. Furthermore, the configuration-file generation system 108 is also configured to communicate with authenticated users over a network. In an embodiment, the configuration-file generation system 108 may function as an IVR system for communicating with authenticated users with the use of interactive voice response technology. In addition, the configuration-file generation system 108 may have an authentication module (not shown) for authenticating users by using state of the art technology.

In an embodiment, the configuration-file generation system 108 takes inputs from an authenticated user for generating the configuration-file. Further, the configuration-file generation system 108 is configured to take minimum instructions from the authenticated user and derive rest of required instructions by using an experience database and semantic web technology. The instructions may be verbal instructions that the configuration-file generation system may interpret and may provide verbal suggestive options to the authenticated user for enabling the user to choose one among the provided options. Furthermore, the application configuration module 110 of the enterprise server 104 is configured to accept the configuration-file generated by the configuration-file generation system 108 as an input. The application configuration module 110 then reads and follows instructions present in the configuration-file (in a structured manner) to configure the application in an autonomous manner (i.e., user input is not required).

Further, as shown, the configuration-file generation system 108 includes a processor 112, an experience database 114, and a module set 116. The module set 116 further includes an IVR module 118, analyzing module 120, suggestion module 122, and configuration-file generation module 124. In an embodiment, IVR module 118 is configured to establish an interactive voice response session with a user over the network 106. In another embodiment, IVR module may also be configured to locally (in absence of any network and by using a speaker and a microphone) establish an interactive voice response session with a user.

In addition, the IVR module 118 is configured to receive voice messages (verbal information) from the user. In an embodiment, the IVR module 118 is configured to use a natural language processor to interpret voice messages received from the user. Moreover, the IVR module 118 is configured to verbally communicate with the user i.e., sending verbal queries to the user. In an embodiment, the IVR module 118 may use a speech synthesizer or a speech box to generate voice messages/queries/information (such as a synthesized voice query) for the user.

In an exemplary embodiment of the present invention, the IVR module 118 receives voice instructions from an authenticated user and the IVR module 118 may convert the voice instructions into a computer readable instruction and may forward the instruction to the analyzing module 120. The analyzing module 120 may then analyze context of the instructions received from the user to interpret/determine a type of application that the user is trying to configure. Thereafter, the analyzing module 120 may analyze the instructions in context of the determined type of application to determine missing information (i.e., if some required information is missing or not).

In case, if the analyzing module 120 determines that certain information is missing then the analyzing module 120 may send a verbal query to the user, via the IVR module 118, corresponding to the missing information. In another case, if the analyzing module 120 finds that required information is available then the analyzing module 120 may forward the available information to the configuration-file generation module 124 for generating a configuration-file based on the available instruction.

Further, in the exemplary embodiment of the present invention, in case if the analyzing module 120 determines that certain information is missing then the analyzing module 120 may notify the suggestion module 122 corresponding to the missing information and available information. The suggestion module 122 may then determine if the missing information can be retrieved from the experience database 114 or from the semantic web (not shown). In an embodiment, the experience database 114 may include structured/indexed information corresponding to various steps and instructions required for configuring a variety of applications. In case, if the suggestion module 122 retrieves missing information, then the analyzing module 120 may automatically fills the missing information and do not bother the user corresponding to the missing information.

In case, if the suggestion module 122 fails to retrieve missing information from the experience database 114 or from semantic web then the suggestion module 122 may notify the analyzing module 120 corresponding to the absence of the information in the semantic web and in the experience database 114. Further, in an embodiment, the suggestion module 122 may retrieve more than one information or solution (i.e., possible solution option) corresponding to the missing information. In such embodiment, the suggestion module 122 may notify the analyzing module 120 corresponding to the retrieved solution options.

Thereafter, the analyzing module 120 may send one or more queries to the user, via the IVR module 118, corresponding to the missing information along with the possible solution options retrieved by the suggestion module 122. In an embodiment, the suggestion module 122 may be configured to send the retrieved solution options to the user via the IVR module 118. It may be appreciated by a person skilled in the art that the IVR module 118 is capable of communicating with the user in verbal, visual, or textual format. Further, in an embodiment of the present invention, the configuration-file generation system 108 may be configured to proactively seek responses, to queries, from the user (via DNS queries or API calls with other services on the network).

Thereafter, based on the response of the user corresponding to the queries, the analyzing module 120 re-checks if still any required information is missing or not. In case, if the analyzing module 120 still finds that information is missing, then the suggestion module may again check if the missing information can be retrieved or not, based on which, queries may be re-sent to the user based on the missing information. This procedure may repeat unless all the required information is retrieved either from the user or by the suggestion module 122.

Further, after retrieving complete information, analyzing module 120 may forward the retrieved information to the configuration-file generation module 124. The configuration-file generation module 124 may then index/structure the received information in a proper manner or sequence. Thereafter, the configuration-file generation module 124 may create an XML file having all the indexed/structured information. In an embodiment, the XML file is formatted in such a manner that the XML file incorporates all instructions to configure required application in a sequential manner. Such instructions may be compiled by an instruction reader (such as application configuration module 110) to execute the instructions in required steps. In an embodiment, the application configuration module 110 is configured to use the configuration-file (i.e., the XML file) generated by the configuration-file generation module 124 to configure an application based on the instructions and information available in the file.

In an exemplary embodiment of the present invention, the configuration-file generation module 124 may further be configured to either query the user or to use the experience database 114 to retrieve credentials that invoke administration rights, which are required to configure an application on the enterprise server 104. In an embodiment, the retrieved credentials may be used to provide administrative access to the configuration-file for configuring enterprise application. Further, the configuration-file generation module 124 may store the administration credentials within the generated configuration-file. This may allow the application configuration module 110 to use the administration credentials wherever administrator authority check is required. This may further ensure that during the execution of the configuration-file there should not be a requirement of the user or of any administrator to be present on the spot for authenticating the configuration process. In addition, the application configuration module 110 may be configured to receive the configuration-file generated by the configuration-file generation system 108 via the network 106.

For example, an administrator of a contact center may need to configure a contact center application while he/she is geographically far away from the server of the contact center. The administrator may then use his/her cell phone to call an IVR system (such as the configuration-file generation system 108) of the contact center that connects the administrator with the IVR module 118 of the contact center server (such as enterprise server 104). The administrator may then speak few instructions to the IVR system of the contact center and the IVR system may store the instructions and may communicate further to query all required information. Thereafter, the IVR system may generate a configuration-file accordingly and may provide the configuration-file to the application configuration module 110 of the IVR system for configuring the required contact center application autonomously. In this way, the administrator gets able to configure an application with ease by communicating over a cell phone and being far away geographically from the contact center server.

It will be appreciated by a person skilled in the art that the credentials stored in the configuration-file for providing administrative access to the configuration-file, may be stored in an encrypted format. Any state of the art encryption technology may be used to encrypt the administrative credentials. Further, in an embodiment, decryption key for decrypting the encryption credentials may be pre-stored in the application configuration module 110 of the enterprise server 104. This may prevent third parties from accessing the administrative credentials even if they get possession on the configuration-file. Furthermore, in an embodiment, the configuration-file may itself be encrypted before sending the configuration-file to the enterprise server 104. In another embodiment, the configuration-file may be encrypted with an additional encryption to the administrative credentials stored in the configuration-file.

Figure 2:
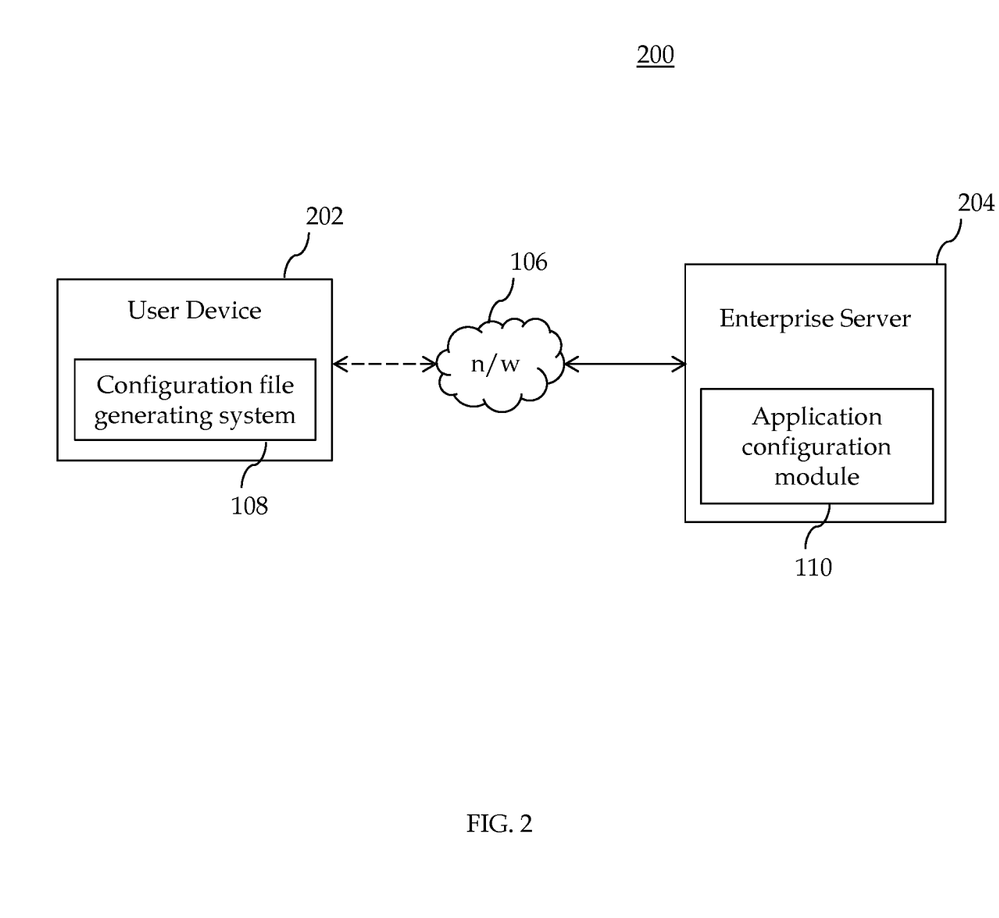
FIG. 2 illustrates another exemplary environment where various embodiments of the present invention are implemented.

FIG. 2 illustrates another exemplary environment 200 where various embodiments of the present invention are implemented. The environment 200 includes a user device 202 having the configuration-file generation system 108, which is in communication with an enterprise server 204 via the network 106. As shown, the configuration-file generation system 108 is present in the user device 202. Therefore, the user device 202 need not be connected with any network (such as network 106) to generate a configuration-file for configuring an application on the enterprise server 204. However, the user device 202 is capable of generating a configuration-file that may be utilized by the application configuration module 110 to configure an application on the enterprise server 204 in presence of the network 106. The dotted arrow between the user device 202 and the network 106 illustrates that the user device 202 sporadically connects with the network 106 on requirement.

Further, in an embodiment, the user of the user device 202 may be able to generate the configuration-file within the user device 202, even in absence of any network. In such embodiment, the user may use a software application (incorporating the configuration-file generation system 108) for generating the configuration-file (as described previously in conjunction with FIG. 1 of the present invention). Further, the software application (IVR module) may use speakerphone and microphone of the user device 202 to verbally interact with the user to function in absence of the network 106.

In an exemplary embodiment of the present invention, the configuration-file generation system 108 may be configured to enable a user to generate the configuration-file in various stages/steps i.e., in non-continuous manner. More specifically, the user may periodically (having time intervals) provide instructions to the configuration-file generation system 108 for generating a required configuration-file. For example, a user may provide one instruction to the configuration-file generation system 108 and may instruct the configuration-file generation system 108 to wait/hold file generation process until next instruction is received. The configuration-file generation system 108 may then eventually receive required information (in short periods or over a period of time) and may only generate configuration-file after receiving complete information.

Furthermore, after generating the configuration-file, the user may either connect with the network 106 and may send the generated configuration-file to the application configuration module 110 of the enterprise server 204 or may manually visit the enterprise and may enter the configuration-file manually into the enterprise server 204. This may enable the user to generate a configuration-file independent of any location or device. The user may use any electronic device having a microphone and speakerphone with processing capabilities to store and execute a software application (implementing the functioning of configuration-file generation system).

For example, an administrator of a contact center may need to configure a contact center application while he/she is travelling in an airplane where there is no network access. The administrator may then use his/her smart phone to open a pre-installed software application (which implements the configuration-file generation system 108) for generating a configuration-file that can be sent to server (after finishing airplane-travel) of the contact center for configuring the application. For generating the configuration-file, the administrator may provide few instructions to the software application via microphone of his smart phone and the software application may store the instructions and may communicate further via the speakerphone of the smart phone to query all required information from the administrator (including administration credentials and configurations). In this manner, the software application receives all required information and creates the required configuration-file that the administrator can save in his/her smart phone for later submission to the server. Thereafter, as soon as the administrator finishes his/her travel, the administrator may connect with Internet and may send the generated configuration-file to the server of the contact center. The server of the contact center may then automatically configure the required application based on the instructions present in the configuration-file. In this way, the administrator gets able to effortlessly generate configuration-file in absence of network and during an unproductive time period.

Further, it will be appreciated by a person skilled in the art that according to one of various embodiments of the present invention, the configuration-file generation system 108 may be implemented on cloud (such as on a third-party server). In such embodiment, one or more users may establish an IVR session (over network) with the third-party server (not shown) to provide instructions/responses to the third-party server for generating a configuration-file. The third-party server may then either send back the generated configuration-file to the one or more users or may send the configuration-file directly to an enterprise server, based on request of the one or more users.

Figure 3A:
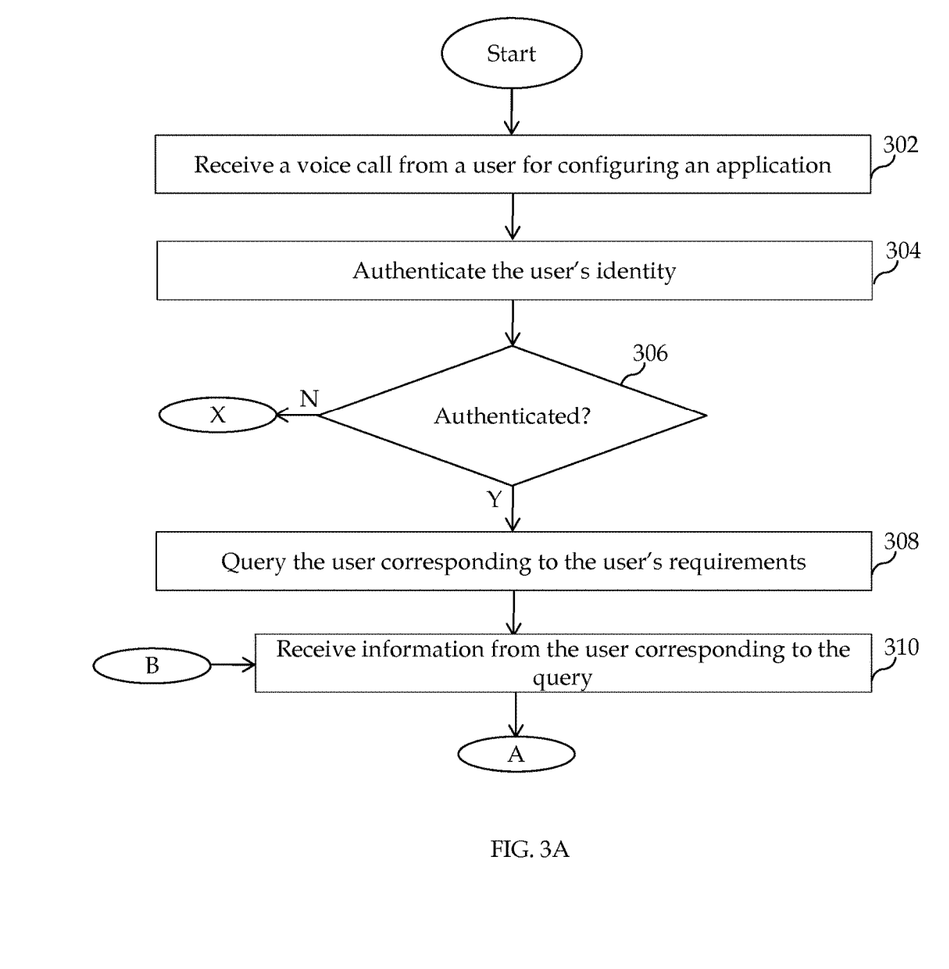
FIGS. 3A and 3B illustrate a method for configuring an application for an enterprise based on a configuration-file, in accordance with an embodiment of the present invention.
Figure 3B:
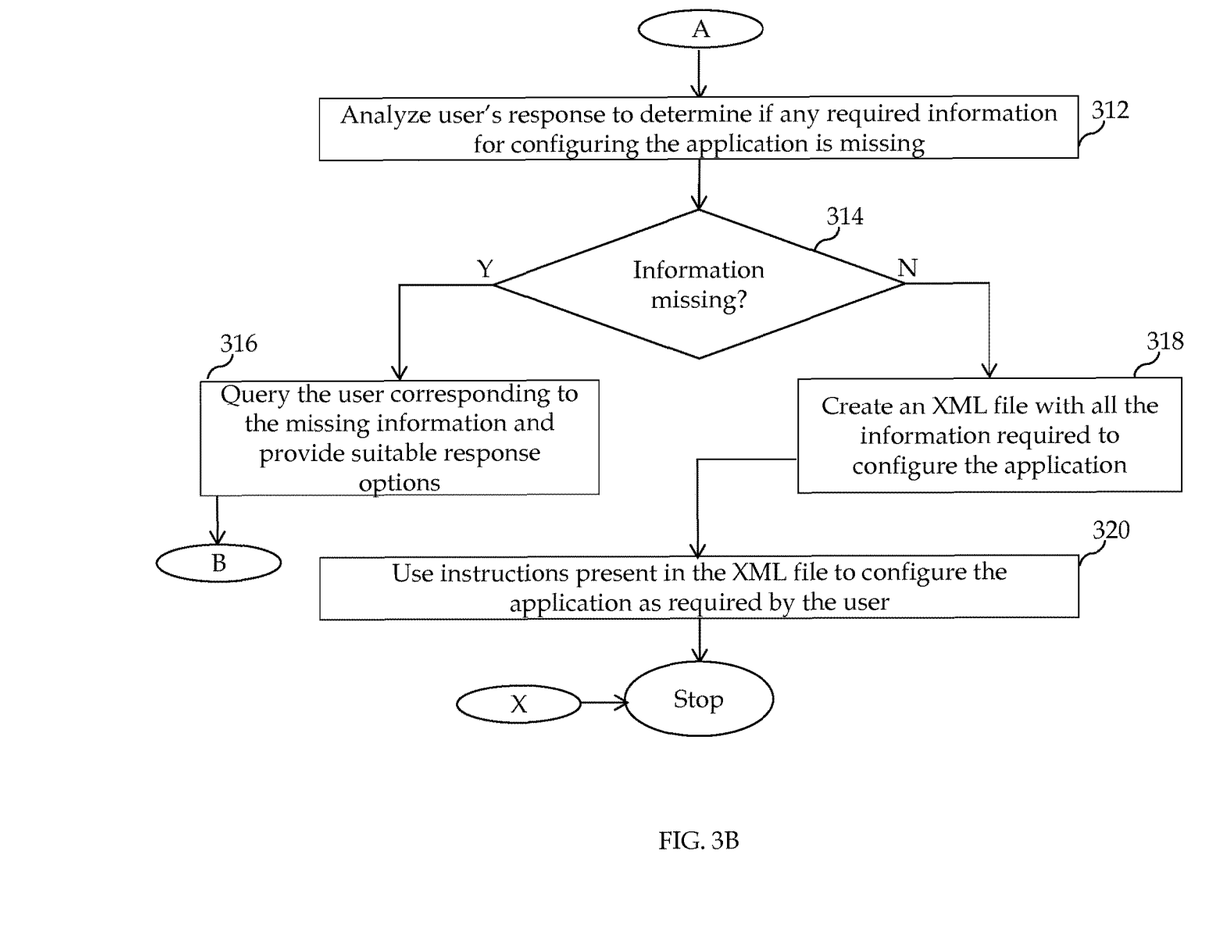

FIGS. 3A and 3B illustrate a method for configuring an application for an enterprise based on a configuration-file. At step 302, an enterprise server (such as enterprise server 104) comprising a configuration-file generation system (such as configuration-file generation system 108) and an application configuration module (such as application configuration module 110) receives a call from a user (or administrator). The enterprise server then connects the call with its IVR system to communicate with the user by using interactive voice response technology.

At step 304, the enterprise server authenticates the user's identity by using state of the art technology. In an embodiment, the enterprise server may ask the user to provide a pre-defined secret code for identifying his/her identity. In another embodiment, the enterprise server may use voice of the user for authentication purposes. Further, at step 306, it determined that if the user is not authenticated then the method ends, or if the user gets authenticated then the method proceeds forward to step 308.

At step 308, IVR system of the enterprise server welcomes the user and queries the user corresponding to the requirement of the user (i.e., purpose of the user to communicate with the enterprise server). Further, at step 310, response (hereinafter may interchangeably be referred to as 'user's response') corresponding to the queries may be received from the user. The user's response may include information that is required for configuring an application. Thereafter, at step 312, as shown in FIG. 3B, the enterprise server analyzes and interprets the response received from the user.

Further, the enterprise server determines whether or not information/instructions received from the user (in form of user response) are sufficient for configuring the application as required by the user. In an embodiment, the enterprise server may use an experience database (such as experience database 114) and semantic web technology to determine what all information is required to configure the application required by the user. Thereby, the enterprise server may compare the available information with the required information to determine missing information.

At step 314, if the enterprise server finds that some information is missing then the method proceeds to step 316. Otherwise, the method proceeds to step 318. At step 316, the enterprise server sends voice queries to the user corresponding to the missing information in order to retrieve missing information from the user. In addition, the enterprise server takes help of the semantic web and the experience database to determine all possible options for the missing information and may prompt the user to either provide the missing information or to select suitable options out of a suggested list of options.

Thereafter, the user may reply to the query by either providing the missing information or by selecting one or more suitable options (as provided by the enterprise server) and the method may start again from the step 310. The enterprise server may again analyze the response of the user to determine whether or not the response (provided by the user) includes all the required information. The enterprise server may then keep asking queries to the user until the user provides all the required information to the enterprise server. If the enterprise server determines that all required information is available for configuring the application as required by the user, then the method may proceed to step 318.

At step 318, the enterprise server may structure, index, and sequence the available information and instructions in a required manner. In an embodiment, the enterprise server may ask essential credentials from the user that is required to invoke administrator authority for configuring the required application. Further, based on the structured/indexed/sequenced information, the enterprise server may create a configuration-file in XML format. It may be appreciated by a person skilled in the art that the configuration-file can be created in any format supported by state of art technology.

Thereafter, at step 320, the enterprise server may send the created configuration-file to the application configuration module of the enterprise server. The application configuration module of the enterprise server may use the configuration-file and the instructions present therein to configure the required application. After configuring the application, the enterprise server may notify the user corresponding to the successful configuration of the application.

Further, in an embodiment of the present invention, the user may use his/her communication device to create the configuration-file, as created by the enterprise server over the IVR call (as described previously). In an embodiment, the communication device may be able to create the configuration-file in absence of any network. The user may install a software application (which may be implementation of the configuration-file generation system 108) in his/her communication device (such as a smart phone, tablet, or computer) and the user may use microphone and speakerphone of his/her communication device to communicate with the installed software application. Further, user may activate the installed software application and may provide his/her requirements to the software application for generating a configuration-file that can be used to configure a required application on the enterprise server. The software application may then analyze the data provided by the user to determine if any required information is missing. In case, if any required information is missing then the software application may ask a query to the user to provide the missing information.

In an embodiment, the software application may also suggest possible options to the user corresponding to the missing information. After receiving required information, the software application may again determine if some other required information is missing. The software application may then keep asking the user for missing information until the software application receive all required information, which is required to configure the application as required by the user. After receiving all information, the software application may generate a configuration-file in XML format, which includes all required instructions and information in a structured manner. Thereafter, the user may connect to a network and send the generated configuration-file to the enterprise server. The enterprise server may then use the configuration-file to configure the required application.

EXAMPLE

An example will now be discussed to illustrate the above principles. The following example illustrates working of the present invention in accordance with an embodiment of the present invention. A person of ordinary skilled in the art will appreciate that the present invention may be performed within any enterprise and is not limited to any particular enterprise or communication framework of the enterprise.

A technician/administrator of a contact center is on an hour-long drive between sites. The technician decides to use his Bluetooth-enabled cell phone to make progress on configuring one of contact center applications on which he/she is scheduled to commission this week. The technician makes a call to the IVR system of the contact center. The IVR system response by speaking "Welcome to the verbal configurator. Please start by telling me your agent count". The technician then replies by saying "I would like 200 voice agents, 50 with email. The 50 have multiplicity. The control directory numbers (CDNs) are 5002 through 5010". The system then determines that information on agent skill sets is missing, and then the system asks "What skill sets do you require? You can choose the following skill sets English Sales, English Support, English Complaints, French Sales, French Support, French Complaints, German Sales, German Support, and German Complaints". The technician then replies "English Sales, French Support, and English Complaints". The system then replies, "Thanks for contacting verbal configurator. A configuration-file, based on your instructions is ready. Would you like to save the configuration-file for later use or to configure the contact center application immediately". The technician then replies suitably as per requirements.

The exemplary systems and methods of this present invention have been described in relation to a contact center. However, to avoid unnecessarily obscuring the present invention, the preceding description omits a number of known structures and devices. This omission is not to be construed as a limitation of the scope of the claimed invention. Specific details are set forth to provide an understanding of the present invention. It should however be appreciated the present invention may be practiced in a variety of ways beyond the specific detail set forth herein.

Furthermore, while the exemplary embodiments of the present invention illustrated herein show the various components of the system collocated, certain components of the system can be located remotely, at distant portions of a distributed network, such as a local area network (LAN) and/or the Internet, or within a dedicated system. Thus, it should be appreciated, that the components of the system can be combined in to one or more devices, such as a switch, server, and/or adjunct, or collocated on a particular node of a distributed network, such as an analog and/or digital telecommunications network, a packet-switch network, or a circuit-switched network.

It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the present invention.

A number of variations and modifications of the present invention can be used. It would be possible to provide for some features of the present invention without providing others.

For example in one alternative embodiment, the systems and methods of this present invention can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like.

In general, any device(s) or means capable of implementing the methodology illustrated herein can be used to implement the various aspects of this present invention. Exemplary hardware that can be used for the present invention includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment of the present invention, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this present invention is dependent on the speed and/or efficiency requirements of the system, the particular function, and the particular software or hardware systems or microprocessor or microcomputer systems being utilized.

In yet another embodiment of the present invention, the disclosed methods may be partially implemented in software that can be stored on a storage medium, executed on programmed general-purpose computer with the cooperation of a controller and memory, a special purpose computer, a microprocessor, or the like. In these instances, the systems and methods of this present invention can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present invention describes components and functions implemented in the embodiments with reference to particular standards and protocols, the present invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the present invention has been presented for purposes of illustration and description. The foregoing is not intended to limit the present invention to the form or forms disclosed herein. In the foregoing Detailed Description for example, various features of the present invention are grouped together in one or more embodiments, configurations, or aspects for the purpose of streamlining the disclosure. The features of the embodiments, configurations, or aspects of the present invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the present invention.

Moreover, though the description of the present invention has included description of one or more embodiments, configurations, or aspects and certain variations and modifications, other variations, combinations, and modifications are within the scope of the present invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. An enterprise server comprising a system for generating a configuration-file and configuring an enterprise application on the enterprise server, the system comprising a processor and a memory, wherein the processor executes instructions stored in memory to: interact with a user for querying and receiving verbal information comprising voice instructions corresponding to configuration of the application; convert the voice instructions into computer readable instructions; analyze the received information converted to computer readable instructions to determine missing information, wherein the missing information is required to configure the application; access at least one of an experience database or semantic web technology to determine if the missing information can be retrieved from one of the experience database or the semantic web technology; send one or more queries to the user corresponding to the missing information along with one or more possible solutions; generate a configuration-file comprising a complete set of instructions required to configure the application of the enterprise server, the configuration-file generated based at least in part on the information received from the user; and configuring automatically the enterprise application based on information stored in the configuration-file.

2. The enterprise server of claim 1, wherein the configuration-file is in XML format.

3. The enterprise server of claim 1, wherein the configuration-file further comprises encrypted credentials for providing administrative access to the configuration-file to configure the application.

4. The enterprise server of claim 1, wherein the processor when executing the instructions provides suggestions to the user, based on queries asked to the user.

5. A user device comprising a configuration-file generation system for generating, while the user device is disconnected from a network, a configuration-file to configure an application on an enterprise server coupled to the network, the configuration-file generation system comprising a processor and a memory, wherein the processor executes instructions stored in memory to: interact with a user for querying and receiving verbal information comprising voice instructions corresponding to configuration of the application; convert the voice instructions into computer readable instructions; analyze the received information converted to computer readable instructions to determine missing information, wherein the missing information is required to configure the application; access at least one of an experience database or semantic web technology to determine if the missing information can be retrieved from one of the experience database or the semantic web technology; send one or more queries to the user corresponding to the missing information along with one or more possible solutions; generate a configuration-file comprising a complete set of instructions required to configure the application of the enterprise, the configuration-file generated based at least in part on the information received from the user; subsequent to generating the configuration file, connect to the network; and send, via the network, the configuration-file to an enterprise server to allow the server to configure the application based on the generated configuration-file.

6. The user device of claim 5, wherein the processor when executing the instructions stores the configuration-file for configuring the application.

7. The user device of claim 5, wherein the device is one of a cell phone, a Smartphone, a laptop, or a tablet.

8. The user device of claim 5, wherein the configuration-file generation system is configured to generate the configuration-file in absence of the user device being connected to a network.

9. The enterprise server of claim 1, wherein the configuration-file generation system comprises a natural language processor for interpreting voice response of the user.

10. A system for generating a configuration-file and configuring an enterprise application for an enterprise in absence of a network, comprising a processor and a memory, wherein the processor executes instructions stored in memory to: interact with a user to query and receive verbal information corresponding to configuration of the application; convert the voice instructions into computer readable instructions; analyze the received information converted to computer readable instructions to determine missing information, wherein the missing information is required to configure the application; access at least one of an experience database or semantic web technology to determine if the missing information can be retrieved from one of the experience database or the semantic web technology; send one or more queries to the user corresponding to the missing information along with one or more possible solutions; and generate a configuration-file comprising a complete set of instructions required to configure the application of the enterprise, the configuration-file generated based at least in part on the information received from the user; and configuring automatically the enterprise application based on information stored in the configuration file.

11. The configuration-file generation system of claim 10, wherein the configuration-file is in XML format.

12. The configuration-file generation system of claim 10, wherein the configuration-file generation system comprises a natural language processor for interpreting voice response of the user.

13. The configuration-file generation system of claim 10, wherein the processor when executing instructions provides suggestions to the user, based on queries asked to the user.

14. A computer-implemented method for automatically configuring an enterprise application, the computer-implemented method comprising: receiving, by a computer, a voice communication call from a user; querying the user, by the computer, corresponding to various instructions required for configuring the enterprise application; receiving and interpreting, by the computer, voice responses from the user corresponding to queries; converting the voice responses into computer readable instructions; analyzing, by the computer, the received voice responses converted into computer readable instructions to determine missing information; determining, by the computer, if missing information required to generate the configuration-file can be determined from one of an experience database or semantic web technology; sending, by the computer, one or more queries to the user corresponding to the missing information along with one or more possible solutions; generating, by the computer, a configuration-file based at least in part on received voice responses from the user for configuring the enterprise application; and configuring, by the computer, the enterprise application automatically based on information stored in the configuration-file.

15. The computer-implemented method of claim 14, wherein the generated configuration-file is in XML format.

16. The computer-implemented method of claim 14, further comprising querying the user corresponding to missing information to configure the enterprise application.

17. The computer-implemented method of claim 16 further comprising providing, by the computer, one or more suggestions for the user corresponding to missing information for enabling the user to provide a response corresponding thereto.

18. The computer-implemented method of claim 14, wherein the interpreting voice responses comprises use of a natural language processor to interpret a voice response of the user.

19. The computer-implemented method of claim 14, wherein querying the user comprises querying the user with a synthesized voice query.

20. The enterprise server of claim 1, wherein the experience database comprises structured information corresponding to various steps and instructions required for configuring applications.

21. The user device of claim 5, wherein the wherein the experience database comprises structured information corresponding to various steps and instructions required for configuring applications.

22. The configuration-file generation system of claim 10, wherein the experience database comprises structured information corresponding to various steps and instructions required for configuring applications.

23. The computer-implemented method of claim 14, wherein the experience database comprises structured information corresponding to various steps and instructions required for configuring applications.

\* \* \* \* \*

UNITED STATES PATENT AND TRADEMARK OFFICE
CERTIFICATE OF CORRECTION

PATENT NO. : 10,282,213 B2  
APPLICATION NO. : 13/908240  
DATED : May 7, 2019  
INVENTOR(S) : Neil O'Connor et al.

Page 1 of 1

It is certified that error appears in the above-identified patent and that said Letters Patent is hereby corrected as shown below:

In the Specification

Column 17, Lines 5-6, "The user device of claim 5, wherein the wherein the experience database" should read --The user device of claim 5, wherein the experience database--.

Signed and Sealed this  
Second Day of June, 2020

Andrei Iancu  
*Director of the United States Patent and Trademark Office*